United States Patent [19]
Fletcher et al.

[11] 4,025,875
[45] May 24, 1977

[54] LENGTH CONTROLLED STABILIZED MODE-LOCK ND:YAG LASER

[76] Inventors: James C. Fletcher, Administrator of the National Aeronautics and Space Administration, with respect to an invention of John Sigfred Osmundson, Mount View, Calif.

[22] Filed: Jan. 5, 1976

[21] Appl. No.: 646,704

[52] U.S. Cl. .......................................... 331/94.5 S
[51] Int. Cl.² .......................................... H01S 3/10
[58] Field of Search .................................. 331/94.5

[56] References Cited
UNITED STATES PATENTS 3,593,189  7/1971  Buhrer ........................ 331/94.5 S

*Primary Examiner*—William L. Sikes

*Attorney, Agent, or Firm*—John O. Tresansky; Robert D. Marchant; John R. Manning

[57] ABSTRACT

A method and apparatus for stabilizing the amplitude and repetition rate of mode-locked Nd:YAG laser pulses by controlling the laser length through a feedback loop is described. The end mirror of the laser is mounted on a piezoelectric crystal which is dithered at a low frequency. A portion of fundamental 1.06 micrometer laser radiation is converted into its second harmonic frequency and the average power of the second harmonic frequency is detected by an integrating detector. The amount of the power of the second harmonic frequency depends on the match between the optical length of the laser cavity and the mode-lock frequency. The length is controlled by a feedback loop which phase compares the output of the second harmonic detector to the piezoelectric crystal dither signal.

6 Claims, 1 Drawing Figure

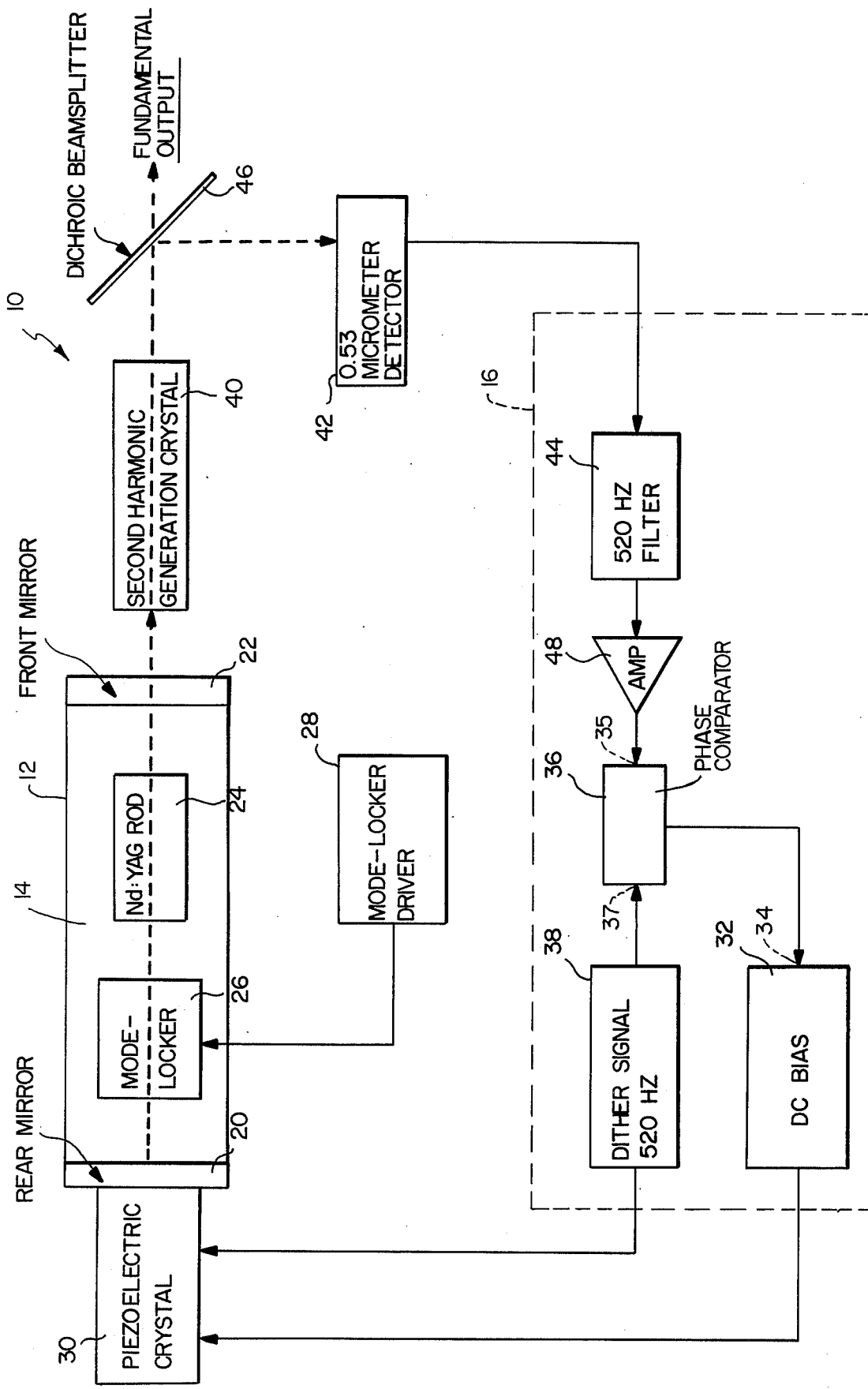

LENGTH CONTROLLED STABILIZED MODE-LOCK ND:YAG LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention generally relates to lasers and is particularly concerned with a novel method and apparatus by which the stability of the amplitude and repetition rate of mode-locked laser pulses can be controlled.

The stability of the amplitude and repetition rate of mode-locked laser pulses, such as Nd:YAG laser pulses, is of importance in pulsed laser communication systems. When a pulsed laser communication system operates in a background limited condition, the signal-to-noise ratio at the receiver can be maximized by gating the receiver and by setting a detection threshold level at the receiver, as is known. The accuracy with which the receiver can be gated or a threshold level set depends on how well the mode-locked pulses can be stabilized.

When a laser is mode-locked, its cavity length has to be matched to the frequency of the output pulses and this condition is given approximately by $$w_m = c / 2L, \quad (1)$$

where $w_m$ is the frequency of the mode-locked pulses, $c$ is the speed of light, and $L$ is the optical path length of the laser cavity. Thermal effects in the laser components are usually the primary cause of laser cavity length variations, and thus the problem of stabilization becomes one of continuously compensating for these thermal perturbations.

Two methods of stabilizing mode-locked lasers are currently known. The first method utilizes a simple feedback loop which detects the mode-locked pulses and then uses the amplified detector output to drive the laser mode-locker. The second known method utilizes a phase-lock loop which compares the detected output of the laser to the signal applied to the mode-locker, the resultant error signal being used to correct the drive of the mode-locker. Both of these known methods have similar disadvantages, however, as neither can easily be used with a loss modulator mode-locking element since time varying losses inside the cavity introduce relaxation oscillation noise on the laser output which, in turn, produces noise in the feedback loops. When a loss modulator is driven hard enough to produce short mode-locked pulses, this noise can increase to a level which causes these feedback systems to lose lock. Both known methods also allow the transmitter frequency to vary continuously, which limits the accuracy with which the detector can be gated.

SUMMARY OF THE INVENTION

It is thus apparent that a need exists in this art wherein the stability of the amplitude and repetition rate of mode-locked laser pulses can be closely controlled without the disadvantages that are attributable to the known techniques. It is the primary objective of the instant invention to provide a method and apparatus by which the control of the stability of such laser pulses can be effected.

A further objective of the instant invention concerns the provision of a method and apparatus for stabilizing mode-locked pulse laser systems wherein the adverse affects of relaxation oscillations on stabilization can be eliminated through simple filtering techniques.

A further objective of the instant invention concerns the provision of a novel stabilization method and apparatus of the type described wherein stabilization of the laser system can be immediately effected without a warm-up period.

Yet another objective of the instant invention concerns the provision of a laser stabilization method and apparatus which allows a receiver to be gated at a constant rate even in the presence of Doppler shifts in the event that the laser transmitter is moving relative to the receiver.

These objects, as well as others which will become apparent as the description proceeds, are implemented by the inventive method and apparatus which, in the preferred embodiment, is described in association with a Nd:YAG solid-state laser system of the mode-locked pulsed type, though the invention has efficacy with other laser materials. In the inventive system, the rear mirror of the laser system is mounted on a piezoelectric crystal which is dithered at a low frequency about a quiescent biassing point so that the length of the laser cavity is time varied about a given equilibrium point at the dither frequency. The fundamental mode-lock optical radiation output of the laser which would occur at a wavelength of 1.06 micrometers with an Nd:YAG lasing material is then partially converted into second harmonic optical radiation, which second harmonic otical radiation is detected by an integrating detector so as to derive a signal representative of the power of the second harmonic optical radiation, this signal being filtered by a filter at the dither frequency so that a resultant signal is obtained representative of the average power of the second harmonic optical radiation at the dither frequency.

The average power of the second harmonic optical radiation depends on the amplitude or, inversely, on the width, of the mode-lock pulses which, in turn, depends on the match between the cavity length and the mode-lock frequency. By comparing the dither signal applied to the piezoelectric crystal with the output at the dither frequency from the second harmonic optical radiation detector, an error signal can be generated which is then fed back to the piezoelectric crystal thus maintaining the laser cavity at a substantially constant length and stabilizing the mode-locked pulses.

The instant inventive technique differs from the known methods of the prior art by maintaining the frequency of the mode-locker drive fixed and by varying the cavity length to correct for thermal drifts. A further marked difference of the instant inventive technique from current technology is concerned with the utilization of the second harmonic optical radiation signal as the signal by which a comparison is made with the piezoelectric dither signal so as to produce and error signal fed back to the piezoelectric crystal to vary the equilibrium length of the laser cavity.

The above and further objects and novel features of the invention will appear more fully from the following detailed description when the same is read in connection with the accompanying drawing. It is to be expressly understood, however, that the drawing is not intended as a definition of the invention but is for the purpose of illustration only.

BRIEF DESCRIPTION OF THE DRAWINGS

In the drawing wherein like parts are marked alike:
The FIGURE is a schematic block-diagram of a Nd:YAG laser system incorporating apparatus constructed in accordance with the instant invention by which the amplitude and repetition rate of mode-locked laser pulses are stabilized.

DETAILED DESCRIPTION OF THE PREFERRED INVENTIVE EMBODIMENT

With particular reference, now, to the Figure in the application drawing, a mode-locked pulse laser system denoted generally by numeral 10, is diclosed. Laser system 10 includes a laser means 12 having a laser cavity 14 defined by a pair of at least partially reflecting mirrors 20 and 22, a laser material such as a Nd:YAG rod 24 disposed in cavity 14 and an intra-cavity mode-locking element 26 controlled by a mode-locker driver 28 in known fashion.

In the preferred embodiment, laser means 12 constitutes a Quantronix model 112 with a 3mm × 50mm Nd:YAG rod, pumped in a double elliptical cavity by two tungsten lamps (not shown) and operated in the $TEM_{00}$ transverse mode. A Hewlett Packard 5105A frequency synthesizer amplified by a Boonton 230A amplifier constitute mode-locker driver 28, driver 28 being coupled to a Quantronix model 302 loss modulator mode locker 26 at approximately 136 MHz, thus giving a mode-locked pulse train at twice the driven frequency, for approximately 272 MHz.

Means are provided to time vary the length of laser cavity 14 about a given equilibrium point in response to an externally generated dither frequency signal. To this end, rear mirror 20 on laser means 12 of laser system 10 is contemplated to be attached to a piezoelectric crystal 30, crystal 30 in the preferred inventive embodiment constituting a Lansing 21.937 piezoelectric crystal providing up to 14 micrometers of translation when +2000 bolts D.C. bias signal is applied thereto.

The D.C. bias signal for piezoelectric crystal 30 is generated by D.C. bias 32 at an adjustable level responsive to an error signal appearing at input 34 and generated by a phase comparator means 36 as will be discussed hereinbelow. The level of the D.C. bias signal generated by D.C. bias 32 and applied to piezoelectric crystal 30 effects a given cavity 14 equilibrium length and constitutes a bias point about which the length is varied at a dither frequency in accordance with a dither frequency signal generating means 38, the dither signal having a frequency of 520 HZ in this preferred embodiment wherein a Nd:YAG rod 24 is utilized in laser 10.

The instant invention makes provision for converting a portion of the fundamental optical radiation of laser means 12 into second harmonic optical radiation. To effect this partial conversion, a second generation crystal 40 is provided in the optical path, crystal 40 preferably comprising a $Ba_2NaNb_5O_{15}$ crystal disposed such that the fundamental 1.06 micrometer mode-lock laser beam is externally focussed thereon. The temperature of the barium sodium niobate crystal 40 is contemplated to be maintained at its optimum second harmonic phase match point to within ± 0.005° C so as to essentially eliminate any variation of the second harmonic optical radiation power due to temperature changes within second harmonic generation crystal 40.

A signal representative of the power of the second harmonic optical radiation at the dither frequency is obtained through the utilization of a micrometer detector 42 in combination with a filter 44. Specifically, the beam exiting from second harmonic generation crystal 40 is collimated and then split by a dichroic beam splitter 46, the resulting 0.53 micrometer beam then being incident on micrometer detector 42 which, in the preferred inventive embodiment, constitutes an BMI 9558 photomultiplier. This second harmonic optical radiation signal, while having a wavelength of 0.53 micrometers, also exhibits a small AC variation at 520 Hz, i.e., at the dither signal frequency. This 520 Hz variation in second harmonic power is, of course, effected by the application of the dither frequency signal to the peizoelectric crystal 30 attached to the rear mirror 20 in that the dither signal causes rear mirror 20 to dither or translate through a small change in length which varies the length of laser cavity 14 and thus effects the modulation of the second harmonic optical radiation power signal.

The second harmonic optical power signal is averaged in micrometer detector 42 and is filtered in 520 Hz filter 44. The signal is then amplified by an amplifier 48 and the amplified signal is fed as one of the inputs 35 to phase comparator 36. Dither signal generating means 38 supplies dither signal to the other input 37 on phase comparator 36. Phase comparator 36 compares the phase angle between the amplified signal received at input 35 and the dither signal received at input 37 and produces an output signal which constitutes an error signal to input 34 of D.C. bias means 32. The error signal output of phase comparator 36 constitutes a voltage which has a D.C. voltage component and a 1040 Hz voltage component. Preferably phase comparator 36 attains maximum output voltage when both inputs, amplified signal at input 35 and dither signal at input 37, are in phase and decreases to zero when they are 180° out of phase. Although the above is preferred, maximum amplitude output voltage can also occur when the two input signals, amplified signal at input 35 and dither signal at input 37, are 180° out of phase and decrease to zero when they are in phase by introducing an electronic phase delay means (not shown) to one of the input signals.

The error signal output voltage of phase comparator 36, having both the D.C. voltage component and the 1040 Hz voltage component, varies as the phase difference between the amplified signals received at input 35 and the dither signal received at input 37. This varying output voltage is fed to input 34 of D.C. bias 32. D.C. bias 32 passes the D.C. voltage component and blocks the 1040 Hz voltage component. Thus, the output D.C. voltage of D.C. bias 32 is fed to piezoelectric crystal 30. The output D.C. voltage from D.C. bias 32 varies as the error signal output voltage varies from phase comparator 36. Thus, the varying signal voltage from D.C. bias 32 varies the voltage applied to piezoelectric crystal 30 and therefore varies the equilibrium point or length of laser cavity 14.

Preferably, phase comparator 36 and D.C. bias 32 are conventional components of a Lansing model 80-210 lock-in stabilizer illustrated in the Figure as item 16. The other components that constitute lock in stabilizer 16 are dither signal generating means 38, amplifier 48, and filter 44. Although it is preferred that a lock in stabilizer 16 be used to vary the error signal output D.C. voltage to piezoelectric crystal 30 other items can also be used. For example, item 38 can be conventional dither signal generating means, item 48 can be conventional amplifier and item 44 can be any conventional filter. In addition, item 36 can be a multiplier device such as, for example, a Burr Brown model 4205 analog multiplier or a lock-in amplifier such as, for example, a Princeton Applied Research model Hr-8. Further, item 32 can be any conventional filtering device which filters the output of phase comparator 36 to pass and amplify the D.C. voltage component or item 32 can be a KEPCO model OPS 1000 operational power supply. The only requirement is that the output voltage of phase comparator 36 vary the output voltage of D.C. bias 32.

The theory of operation of the instant inventive technique by which the average second harmonic optical radiation power signal at the dither frequency can be compared with the dither frequency signal utilized to effect time variation of cavity length so as to alter the equilibrium point of the cavity length variations and effect stabilization of a mode-locked pulse laser system can readily be determined from the following mathematical discussion.

The output pulses of a mode-locked laser are gaussian in time and the instantaneous mode-locked power at the fundamental laser frequency, $w$, during any pulse period can be written as $$P_w(t) = P_o e^{-\alpha t^2} \quad (2)$$

where $\alpha$ is a constant and $P_o$ is the peak power of a single mode-locked pulse. The average mode-locked power at the fundamental laser frequency is then given by $$\overline{P}_w = W_m P_o \sqrt{\frac{\pi}{\alpha}} \quad (3)$$

where, again $w_m$ is the mode-locked frequency.

The instantaneous power at the second harmonic frequency, $2w$, is given by $$P_{2w}(t) = K P_o^2 e^{-2\alpha t^2} \quad (4)$$

where $K$ expresses how efficiently fundamental power is converted into the second harmonic frequency and is assumed to be a constant for the purposes of this illustration.

The average power at the second harmonic frequency is then given by $$\overline{P}_{2w} = W_m K P_o^2 = \frac{K P_w^2}{W_m \tau} \sqrt{\frac{\ln 2}{\pi}} \quad (5)$$

where $\tau$ is the full width at half the maximum amplitude of the pulse described by (2).

The average power at the second harmonic frequency can be related to changes in laser cavity length from the optimum length given by (1) by considering the dependence of $\tau$ on changes in cavity length. This discussion assumes mode-locking using loss modulator mode-lockers. For this case, the time varying amplitude transmission through the mode-locking element is given by $$A(t) \cong \exp[-[2\delta \sin^2\theta + 2\delta W_m t \sin 2\theta + 2\delta (W_m t)^2 \cos 2\theta]] \quad (6)$$

where $\delta$ is the depth of modulation and $\theta$ is the phase angle at which the pulse passes through the loss modulator mode-lockers.

The phase angle, $\theta$, can be related to change in laser cavity length. Assume $\theta = 0$ for some laser cavity equilibrium length, $L_o$. Then for a fixed mode-locked frequency and small changes in cavity length, $\Delta L$, we have $$\theta = \Delta L F(W_m, \delta, g_o) \quad (7)$$

where $f(w_m, \delta, g_o$, the double pass midband saturated gain of the laser. For simplicity, we will assure $F(w_m, \delta, g_o)$ to be a constant.

For an AM mode-locked laser, the pulse width is given by $$\tau = \frac{\sqrt{\sqrt{2} \ln 2}}{\pi} \left[\frac{g_o}{\delta \cos 2\theta}\right]^{1/4} \left[\frac{1}{f_m \Delta f}\right]^{1/2} \quad (8)$$

where $\Delta f$ is the frequency width of the laser gain curve and $f_m$ is the mode-locked frequency in cycles per second.

Making use of (7), we can write $$\tau = c |\cos[2\Delta L F(W_m, \delta, g_o)]| \quad (9)$$

where $$c \cong \frac{1}{\pi} \left[\frac{\sqrt{2} \ln 2}{f_m \Delta f}\right]^{1/2} \left[\frac{g_o}{\delta}\right]^{1/4}$$

Equations (5) and (9) can now be combined to give average power at the second harmonic frequency as a function of detuning of the cavity length, $$\overline{P}_{2w} = \frac{K \overline{P}_w^2}{W_m C} \sqrt{\frac{\ln 2}{\tau \psi}} [\cos [2\Delta L F(W_m, \delta, g_o)]]^{1/4} \quad (10)$$

The technique of the instant invention has been found to possess marked advantages over prior art attempts at stabilization. For one, it should be appreciated that relaxation oscillations occur in a Nd:YAG laser at approximately a 60 kHz rate. Yet by utilizing the second harmonic detection scheme of the instant invention, the detector output is filtered to pass only frequencies below the rate at which relaxation oscillations occur. The feedback loops of the prior art, on the other hand, were such that pulses were detected at the mode-lock frequency and, with such an approach, it is essentially impossible to make a narrow passband filter centeed at 272 MHz which discriminates against relaxation oscillation noise and, at the same time, follows changes in the mode-lock frequency.

The length stabilization technique of the instant invention also allows a receiver to be gated at a constant rate, even in the presence of Doppler shifts. If the transmitter is moving relative to the receiver as would occur, for example, in a space communication system, then the frequency of the mode-locker can be corrected to account for the Doppler shift. With the instant inventive technique, the laser will re-tune its length to match the new mode-locked frequency, and the receiver will detect pulses at an unchanged frequency.

Yet another advantageous feature of the instant inventive technique resides in the fact that the laser can be stabilized immediately upon being turned on, thus eliminating power consumption during a warm-up period.

From the foregoing detailed description, it should now be apparent that all the objectives set forth at the outset of this specification have been successfully achieved. Moreover, while there has been shown and described a present preferred embodiment of the invention, it is to be distinctly understood by those skilled in the art that the invention is not limited thereto, but may otherwise be variously embodied and practiced within the scope of the following claims.

Accordingly, the invention having been described in its best embodiment and mode of operation, that which is described to be claimed by Letters Patent is:

1. A method of stabilizing the amplitude and repetition rate of a mode-locked pulse laser means, comprising the steps of:
   time varying the length of a laser cavity in said laser means about a given equilibrium point in response to a dither frequency signal;
   converting a portion of the fundamental optical radiation of said laser into second harmonic optical radiation;
   deriving a signal representative of the power of said second harmonic optical radiation at said dither frequency;
   comparing the phase angle of said dither frequency signal which effects said laser cavity length variation with the phase angle of said representative of said second harmonic optical radiation power at said dither frequency; and
   shifting said equilibrium point about which said laser cavity length is varied in response to a detected phase difference.

2. Apparatus for stabilizing the amplitude and repetition rate of a mode-locked pulse laser means having a laser cavity defined by an axially spaced pair of a least partially reflecting mirrors, a laser material disposed in said laser cavity, and an intra-cavity mode-locking element, said apparatus comprising:
   piezoelectric crystal means attached to one of said mirrors, said piezoelectric crystal means being both responsive to the application of a D.C. biasing signal thereto to effect a given though adjustable laser cavity equilibrium length and to the application of a dither frequency signal thereto to time vary said laser cavity length about said equilibrium length at said dither frequency;
   means for applying said dither frequency signal to said piezoelectric-crystal;
   means for applying D.C. biasing signal to said piezoelectric crystal at an adjustable level responsive to an error signal; and
   feedback loop means for generating said error signal representative of loss of stabilization of the amplitude and repetition rate of the fundamental optical radiation of said laser means, said feedback loop means including:
   a. converting means for converting a portion of the fundamental optical radiation of the laser into second harmonic optical radiation;
   b. detecting means for deriving a signal representative of the average power of said second harmonic optical radiation at said dither frequency; and
   c. comparison means for comparing said dither frequency signal with said signal representative of said second harmonic optical radiation power at said dither frequency and for generating an output signal in response to a comparison difference said output signal constituting said error signal.

3. The apparatus of claim 2, wherein said comparison means compare the phase angle difference between said diether frequency signal and said signal representative of the second harmonic optical radiation power of said laser means.

4. The apparatus of claim 3, wherein said laser means includes a Nd:YAG rod.

5. The apparatus of claim 4, wherein said converting means comprises a second harmonic generating crystal element in the optical path of said laser means, and wherein said detecting means comprises a photomultiplier means coupled to a filter means passing said signal representative of the average power of said second harmonic optical radiation at said dither frequency.

6. The apparatus of claim 5, wherein said comparison means comprises a phase comparator receiving an output of said filter means as one input thereof and receiving said dither frequency signal as another output thereof.

* * * * *